United States Patent
Park et al.

(10) Patent No.: US 10,671,207 B2
(45) Date of Patent: Jun. 2, 2020

(54) MULTI-TILE DISPLAY SYSTEM AND DRIVING METHOD OF UNRELATED DISPLAY DEVICES USING A USER INPUT PATTERN

(71) Applicant: LG DISPLAY CO., LTD., Seoul (KR)

(72) Inventors: Dongwon Park, Goyang-si (KR); SungHoon Kim, Paju-si (KR); Jongmin Park, Anyang-si (KR); JoonHee Lee, Seoul (KR); YongChul Kwon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/841,142

(22) Filed: Dec. 13, 2017

(65) Prior Publication Data

US 2018/0181252 A1 Jun. 28, 2018

(30) Foreign Application Priority Data

Dec. 28, 2016 (KR) .......................... 10-2016-0181604

(51) Int. Cl.
| | |
|---|---|
| G06F 3/041 | (2006.01) |
| G06F 3/147 | (2006.01) |
| G06F 3/14 | (2006.01) |
| G09G 3/20 | (2006.01) |
| G09G 3/3208 | (2016.01) |
| G09G 3/36 | (2006.01) |

(52) U.S. Cl.
CPC ............ *G06F 3/0416* (2013.01); *G06F 3/147* (2013.01); *G06F 3/1446* (2013.01); *G09G 3/2092* (2013.01); *G09G 3/3208* (2013.01); *G09G 3/36* (2013.01); *G09G 2300/026* (2013.01); *G09G 2354/00* (2013.01); *G09G 2356/00* (2013.01); *G09G 2370/16* (2013.01)

(58) Field of Classification Search
CPC ...... G06F 3/0416; G06F 3/1446; G06F 3/147; G09G 3/2092; G09G 3/36; G09G 3/3208
See application file for complete search history.

(56) References Cited

U.S. PATENT DOCUMENTS

| | | | | |
|---|---|---|---|---|
| 2012/0249415 A1* | 10/2012 | Nakajima | ............. | G06F 1/1647 345/156 |
| 2014/0168277 A1* | 6/2014 | Ashley | .................. | G06F 3/1446 345/672 |

(Continued)

*Primary Examiner* — Ryan A Lubit
(74) *Attorney, Agent, or Firm* — Seed IP Law Group LLP

(57) ABSTRACT

A multi-display system and a driving method of the same are disclosed. The multi-display system includes a multi-display having a plurality of displays each including a sensor for sensing a user input pattern, a position detector configured to sequentially output extended display identification data (EDID) and time-position information together with display identification information of each of the displays based on user input pattern sensing information and display information input from each of the displays, an arrangement calculator configured to store the display identification information and the EDID and time-position information of each of the displays, and calculate arrangement positions of the displays based on the display identification information and the EDID and time-position information, and an image processor configured to divide and distribute an original image of an image source in accordance with the arrangement positions of the displays.

20 Claims, 12 Drawing Sheets

(56) References Cited

U.S. PATENT DOCUMENTS

2015/0186029 A1* 7/2015 Khani .................. G06F 3/1423
                                                   345/173
2016/0098131 A1* 4/2016 Ogata .................. G06F 1/1643
                                                   345/173

* cited by examiner

MULTI-TILE DISPLAY SYSTEM AND DRIVING METHOD OF UNRELATED DISPLAY DEVICES USING A USER INPUT PATTERN

CROSS-REFERENCE TO RELATED APPLICATION

This application claims the benefit of Korean Patent Application No. 10-2016-0181604, filed Dec. 28, 2016, the entire disclosure of which are hereby incorporated by reference herein for all purposes.

BACKGROUND

Technical Field

The present disclosure relates to a multi-display system and a driving method of the same.

Description of the Related Art

Various displays such as a liquid crystal display (LCD), an organic light emitting diode (OLED) display, a plasma display panel (PDP), a field emission display (FED) are used.

Recently, research on a multi-display system (tiled display system) that integrates various kinds of displays to function as a desired combination display of users has been actively conducted. A multi-display is used as a single large-screen display by combining several displays.

As shown in FIG. 1, such a multi-display includes a plurality of displays #1 to #12, a distributor for distributing an image signal to the displays #1 to #12, and cables for electrically connecting the distributor and the displays #1 to #12. The multi-display system can display super-high-resolution images that cannot be expressed on a single display.

In order to implement the multi-display system, arrangement and order of the plurality of displays #1 to #12 must be predetermined as shown in FIG. 2. Then, an original image of an image source should be equally distributed and transmitted to the respective displays #1 to #12 in accordance with the predetermined arrangement.

BRIEF SUMMARY

Accordingly, an object of the present disclosure is to provide a multi-display system and a driving method of the same that provide exact position information for each of displays changed to an arbitrary position and exactly distribute an original image of an image source to the displays in accordance with the changed position to prevent mismatch of a reproduced image.

In one aspect, there is provided a multi-display system including a multi-display having a plurality of displays each including a sensor for sensing a user input pattern, a position detector configured to sequentially output extended display identification data (EDID) and time-position information together with display identification information of each of the displays based on user input pattern sensing information and display information input from each of the displays, an arrangement calculator configured to store the display identification information and the EDID and time-position information of each of the displays, and calculate arrangement positions of the displays based on the display identification information and the EDID and time-position information, and an image processor configured to divide and distribute an original image of an image source in accordance with the arrangement positions of the displays.

The user input pattern may be a touch input pattern and the sensor may be a touch sensor.

The EDID and time-position information may include resolution information of a corresponding display, size information of the corresponding display, time and position information of a start touch point in the corresponding display, and time and position information of a last touch point in the corresponding display.

The user input pattern may be an optical input pattern and the sensor may be a light receiving sensor.

The EDID and time-position information may include resolution information of a corresponding display, size information of the corresponding display, time and position information of a start light receiving point in the corresponding display, and time and position information of a last light receiving point in the corresponding display.

The arrangement calculator may calculate positions of boundaries of the displays based on the display identification information and the EDID and time-position information.

The displays may include a plurality of boundaries, and the user input pattern may be applied to all of the displays through some of the boundaries.

The user input pattern may be continuous.

The user input pattern may be continuous only in some boundaries between the displays and in the boundaries' vicinity, and may be discontinuous in the other regions.

In another aspect, there is provided a driving method of a multi-display system for driving a multi-display having a plurality of displays each including a sensor for sensing a user input pattern including outputting sequentially extended display identification data (EDID) and time-position information together with display identification information of each of the displays based on user input pattern sensing information and display information input from each of the displays, storing the display identification information and the EDID and time-position information of each of the displays and calculating arrangement positions of the displays based on the display identification information and the EDID and time-position information, and dividing and distributing an original image of an image source in accordance with the arrangement positions of the displays.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
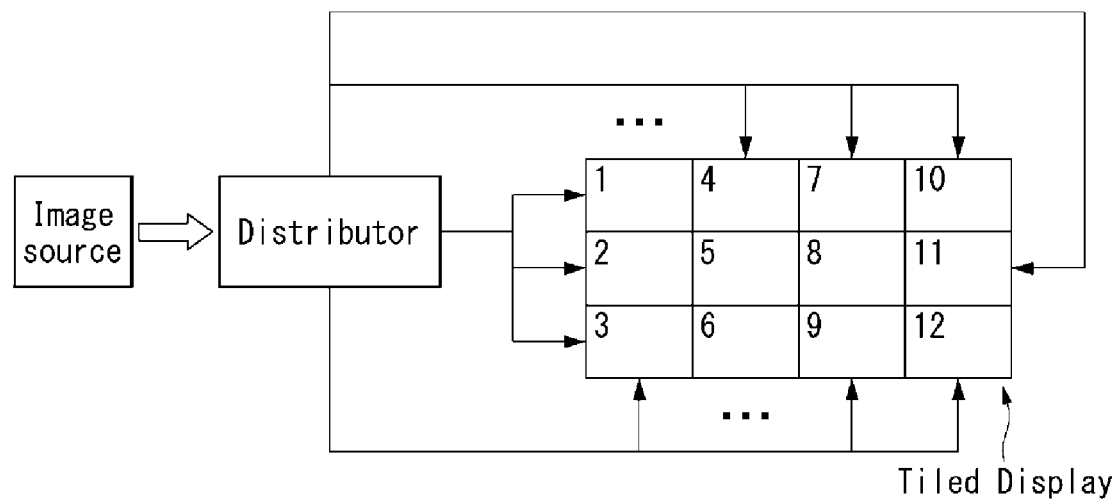
FIG. 1 is a schematic diagram of a conventional multi-display system.

Advantages and features of the present disclosure and methods for accomplishing the same will become apparent with reference to embodiments described in detail below with reference to the accompanying drawings. However, the present disclosure is not limited to the embodiments disclosed below, and may be implemented in various forms. These embodiments are provided so that the present disclosure will be exhaustively and completely described, and will fully convey the scope of the present disclosure to those skilled in the art to which the present disclosure pertains. The present disclosure is defined by the scope of the claims.

Shapes, sizes, ratios, angles, number, and the like illustrated in the drawings for describing embodiments of the present disclosure are merely exemplary, and the present disclosure is not limited thereto. Like reference numerals designate like elements throughout the description. In the following description, when a detailed description of well-known functions or configurations related to this document is determined to unnecessarily cloud a gist of the disclosure, the detailed description thereof will be omitted. In the present disclosure, when the terms "include," "have," "comprised of," etc. are used, other components may be added unless "only" is used. A singular expression can include a plural expression as long as it does not have an apparently different meaning in context.

In the explanation of components, even if there is no separate description, it is interpreted as including a tolerance for variations based on use, manufacturing or potential errors. In the description of position relationship, when a structure is described as being positioned "on or above," "under or below," "next to" another structure, this description should be construed as including a case in which the structures contact each other as well as a case in which a third structure is disposed therebetween.

The terms "first," "second," etc. may be used to describe various components, but the components are not limited by such terms. These terms are only used to distinguish one component from another component.

The features of various embodiments of the present disclosure can be partially combined or entirely combined with each other, and is technically capable of various interlocking and driving. The embodiments can be independently implemented, or can be implemented in conjunction with each other.

Hereinafter, preferred embodiments of the disclosure will be described in detail with reference to the accompanying drawings.

Figure 2:
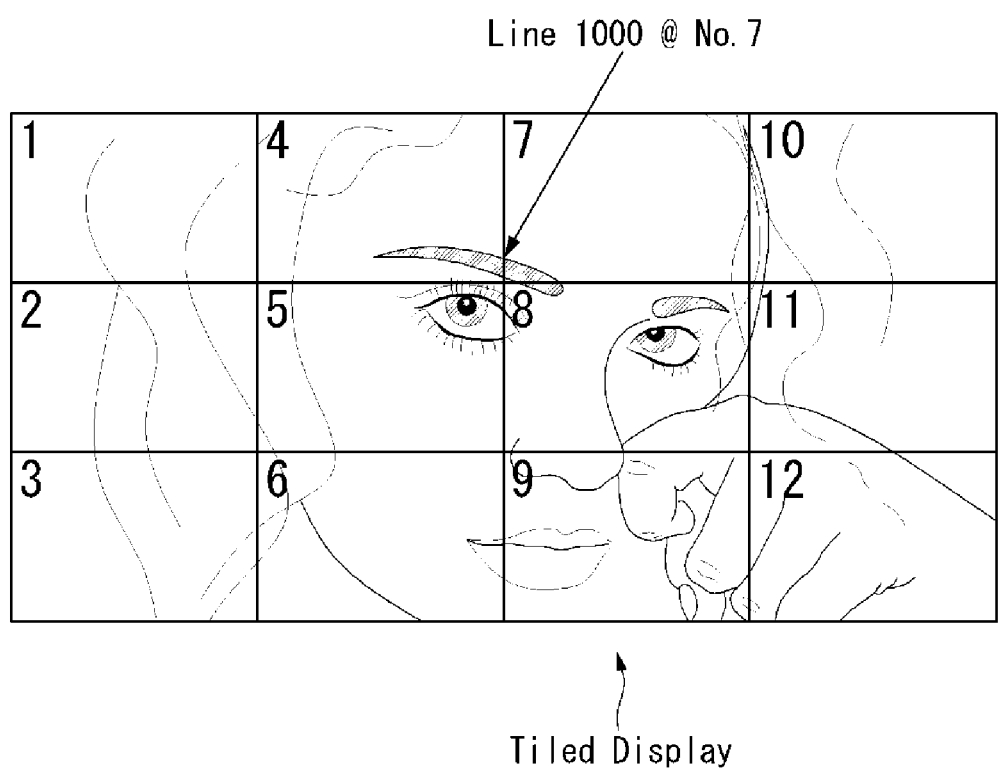
FIG. 2 is a diagram illustrating an image displayed on a multi-display of FIG. 1.
Figure 3:
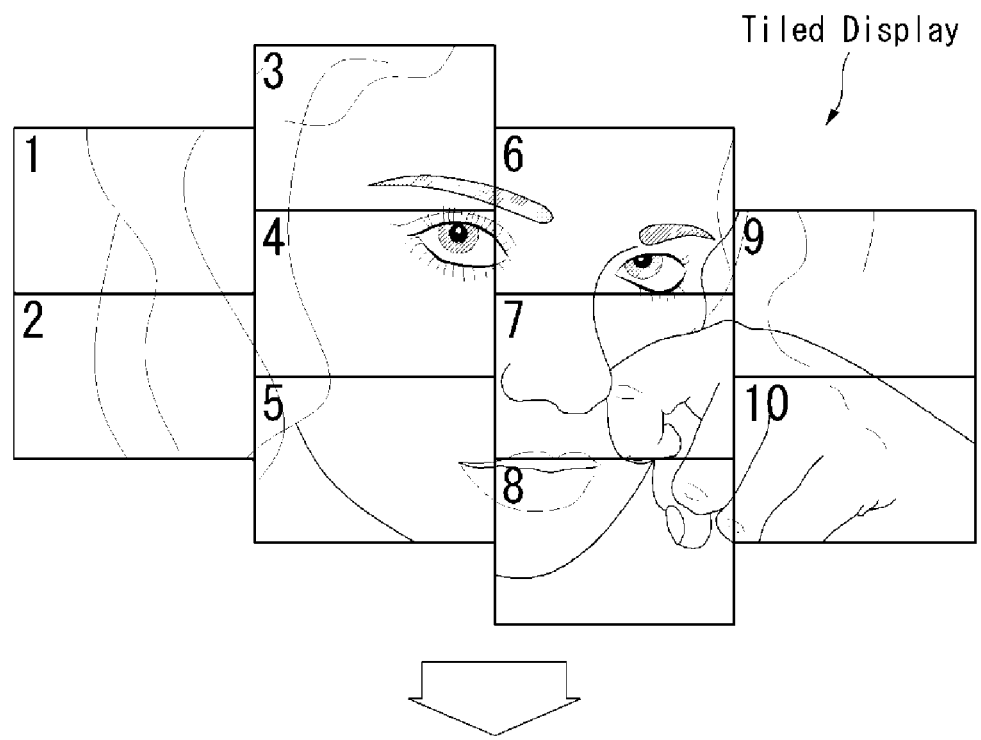
FIG. 3 is a diagram illustrating a multi-display changed to an arbitrary position and reproduced images thereof.
Figure 3:
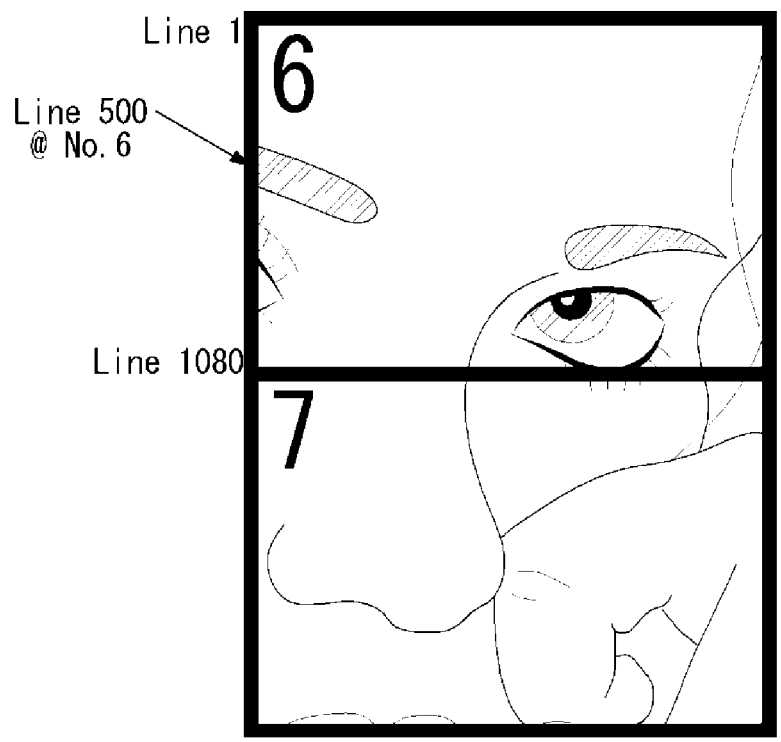

One of the problems recognized by the inventors which they have solved is shown in FIG. 3. In some uses of a multi-display system, for the purpose of aesthetic design, interior use or bringing a new group of devices together, the displays #1 to #10 are configured to have an arbitrary arrangement/position different from the predetermined arrangement/position of displays #1-#12 as shown in FIG. 2. In addition, the displays might be any unknown number that have no connection or relationship to each other until they are brought together to make a single common display and after being used as a common display, are separated again for use as individual displays.

A first problem is that the number of displays will not be known in advance. The number might be 8, 17, 10 or any number, depending on the number of new units and displays brought to the group. In the example of FIG. 3, the number of displays has been reduced from 12 in number to 10 in number, so the original image of the image source needs to be properly and equally divided and distributed to the displays #1 to #10. In addition, the relative position of the displays may change or be created new each time a new group is formed. To solve this, the inventors have proposed a system to establish an exact position of each of the displays #1 to #10 that have been changed to an arbitrary position with the single display 10.

When the displays #1 to #10 are changed to an arbitrary position, it is difficult to accurately determine the changed position. Accordingly, without use of the concepts and details as taught herein, in the past is has not been possible to distribute the original image of the image source exactly to the changed positions of the displays #1 to #10, particularly when there is a different number than the original displays.

For this reason, there systems of the prior art were not able to manage the change of a multi-display assembly that changed in both number of displays and their location, so the current state of the art limits this ability and such products and configurations.

For example, when the positions of the displays are changed from FIG. 2 to FIG. 3, the original image of the image source should be distributed such that an eyebrow position of a person in the original image is changed from a 1000th line of a 7th display (FIG. 2) to a 500th line of a 6th display. However, this is impossible with current systems and FIG. 3 shows that distortions of this type need to be corrected. A mismatch occurs in a reproduced image if the division and distribution of the original image is wrong.

Figure 4:
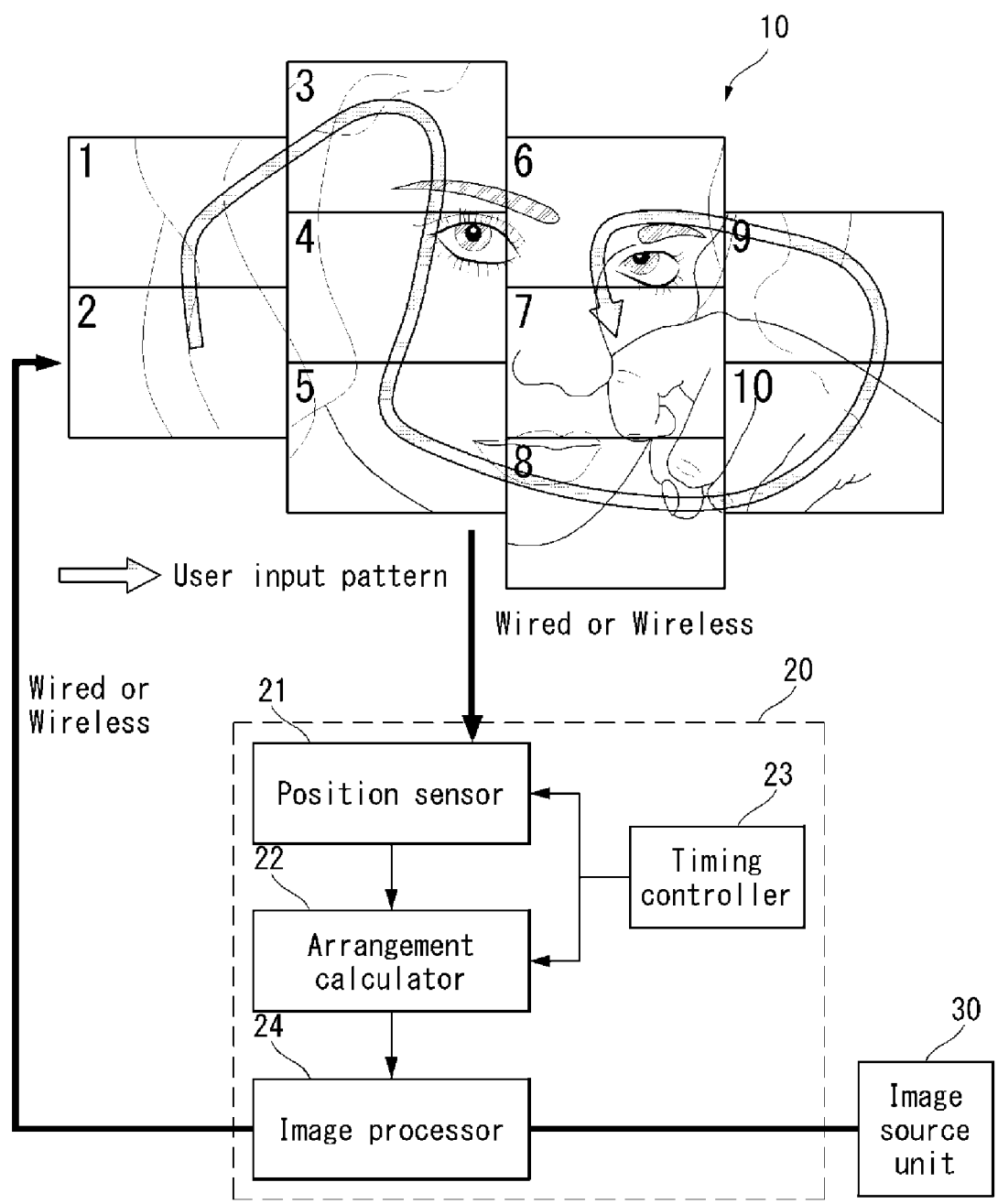
FIG. 4 is a diagram illustrating a multi-display system according to an embodiment of the disclosure.
Figure 5:
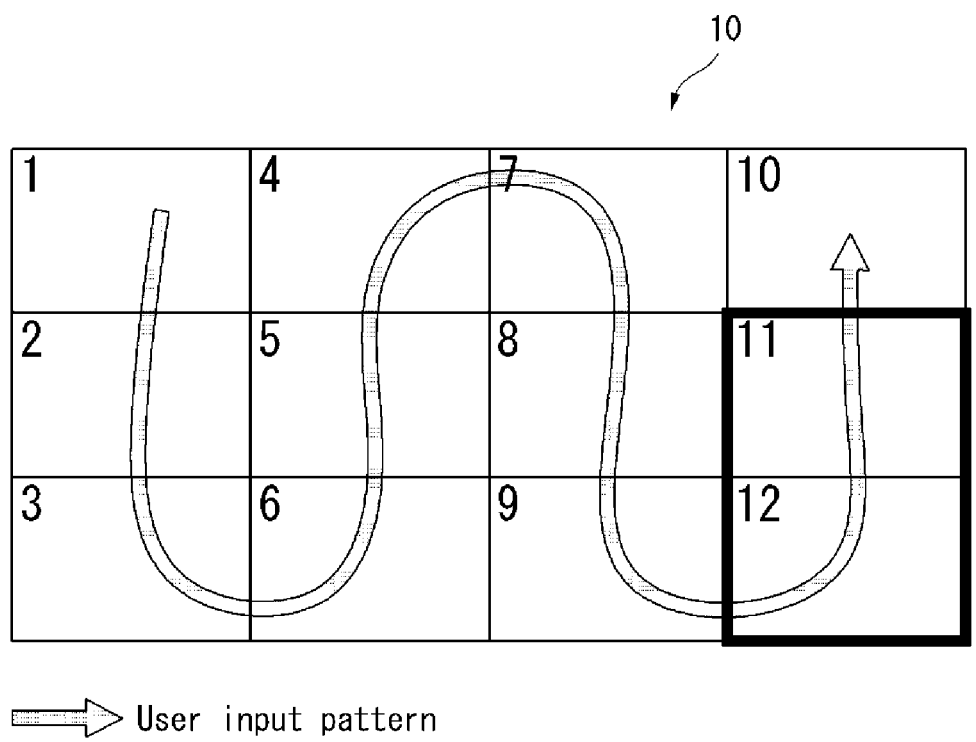
FIG. 5 is a diagram illustrating an example of a user input pattern for a multi-display arranged in a first form.
Figure 6:
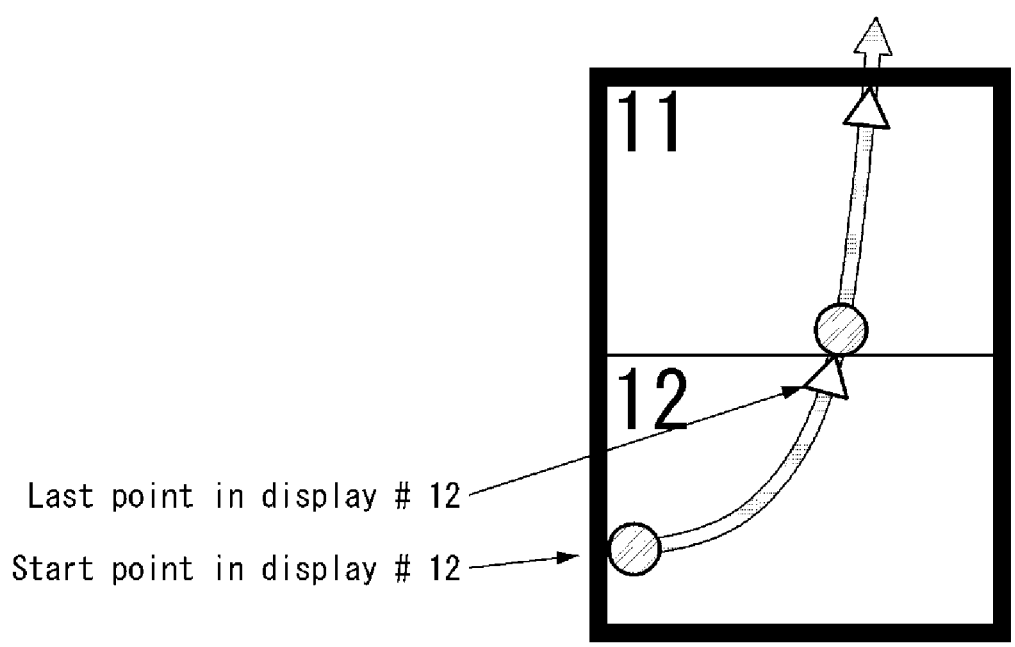
FIG. 6 is an enlarged diagram illustrating a user input pattern for displays 11 and 12 of FIG. 5.
Figure 7:
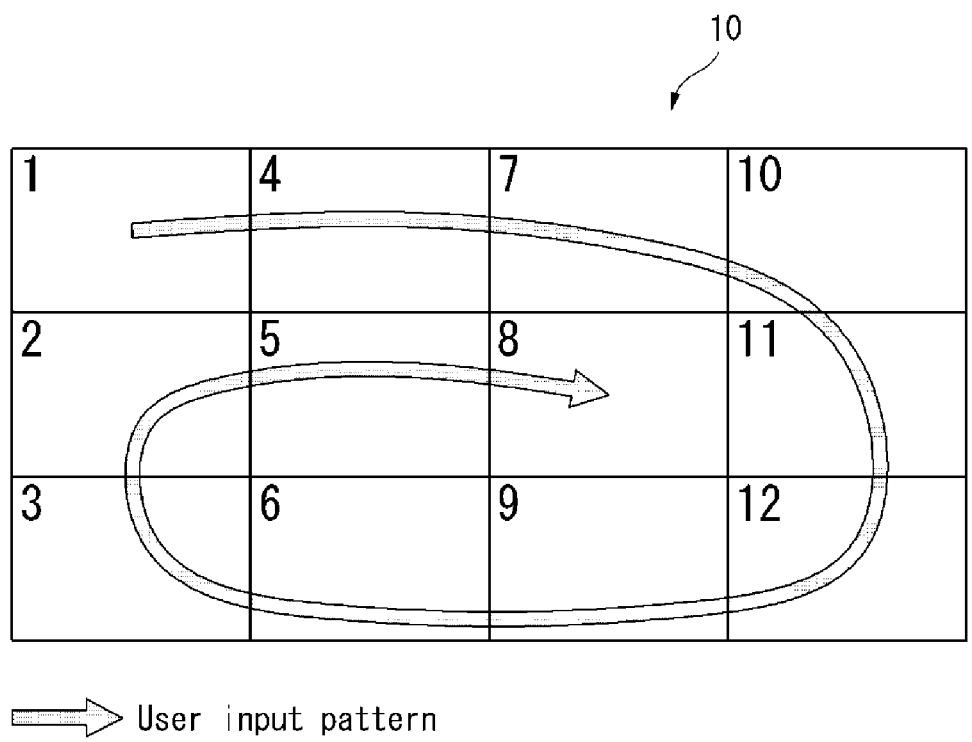
FIG. 7 is a diagram illustrating another example of a user input pattern for a multi-display arranged in a first form.
Figure 8:
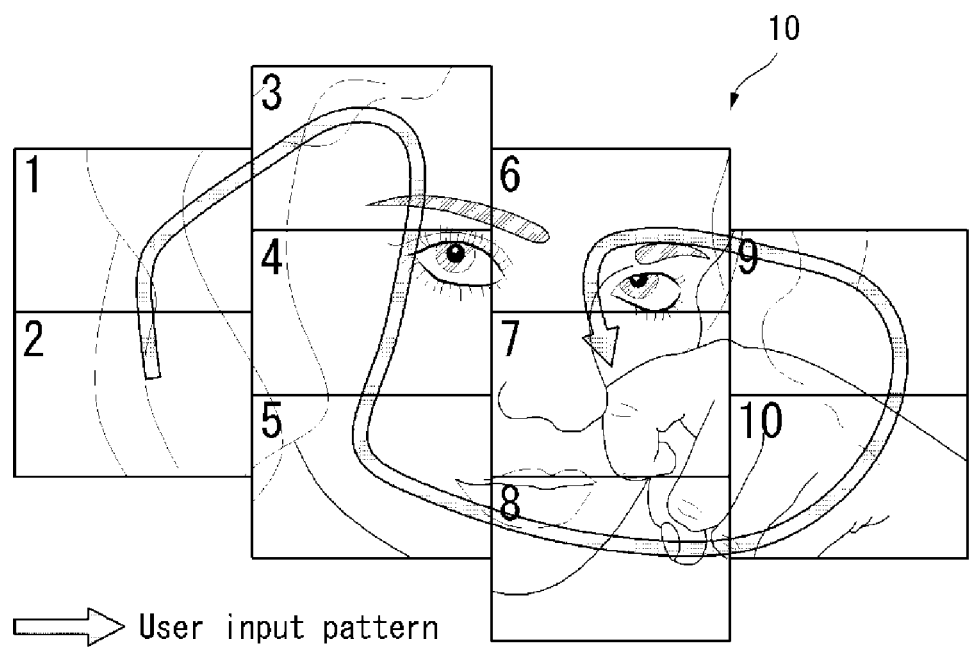
FIG. 8 is a diagram illustrating an example of a user input pattern for a multi-display arranged in a second form.

FIG. 4 is a diagram illustrating a multi-display system according to an embodiment of the disclosure. FIG. 5 is a diagram illustrating an example of a user input pattern for a multi-display arranged in a first form. FIG. 6 is an enlarged diagram illustrating a user input pattern for displays 11 and 12 of FIG. 5. FIG. 7 is a diagram illustrating another example of a user input pattern for a multi-display arranged in a first form. FIG. 8 is a diagram illustrating an example of a user input pattern for a multi-display arranged in a second form.

Referring to FIG. 4, a multi-display system according to an embodiment of the disclosure includes a multi-display 10, a distributor 20, and an image source unit 30.

The multi-display 10 constitutes a combination of a plurality of displays #1 to #10. Each of the displays may be implemented by a liquid crystal display (LCD), an OLED display, or the like, but is not limited thereto. The displays #1 to #10 do not need to be specially made for multi-display use. For example, the displays #1 to #10 may be implemented using a mobile device, a notebook computer, a television, or the like. In one example, displays #1-#10 are a combination of cell phones, tablets, and computers that are not related to each other. A group of independent users can set their video output devices which are combination of tablets, cell phones and notebook computer together to create a single large screen for them all to watch together. A common driving signal that originates in one of them can be used to drive all the displays together as if they were a single unit. The drive signals can be sent wirelessly by blue tooth, NFC, Wi-Fi or other technique to all other the displays as shown in FIG. 4. These displays #1 to #10 include a display panel and a driver for writing data of an input image on the display panel. The distributor 20 can be included within the processor of one of the devices #1-#10, such as being the main processor circuit that is present in a tablet, cell phone or notebook computer.

The displays #1 to #10 may be the same or different from each other in resolution and size. For example, one device might be a cell phone and another a notebook computer. In the drawings of the disclosure, the displays #1 to #10 are shown to have the same resolution and size, but the technical spirit of the disclosure is not limited thereto. The technical spirit of the disclosure is particularly beneficial when the resolution and size of at least some displays differ from those of the remaining displays. For example, the display #1 can be a cell phone having display dimensions of 140 mm×80 mm and a resolution of 1920×1080, while the display #2 is tablet having display dimensions of 250 mm×180 mm with a resolution of 2048×1536 and each also having different resolutions. Thus, these two displays have different aspect ratios, different dimensions, different areas and different resolutions, Each of the displays #1 to #10 may include a sensor for sensing a user input pattern. Here, the user input pattern may be a touch input pattern or an optical input pattern. When the user input pattern is implemented as the touch input pattern, the sensor may be a touch sensor. The touch sensor can be implemented by various known types such as a capacitance type, a resistance film type, a constant voltage type, a pressure type, an ultrasonic type, a complex type, and the like. Meanwhile, when the user input pattern is implemented as the optical input pattern, the sensor may be a light receiving sensor. The light receiving sensor may be implemented as a photodiode or a phototransistor capable of receiving infrared rays, laser light, or the like.

The user input pattern may be continuous for convenience of input (see FIGS. 5, 7, and 8). On the other hand, the user input pattern may be continuous only in some boundaries between the displays and in the boundaries' vicinity, and may be discontinuous in the other regions (see FIG. 9).

When the user input pattern is applied to each of the displays #1 to #10, each of the displays #1 to #10 senses the user input pattern through the sensor, generates user input pattern sensing information, and outputs display information together with the user input pattern sensing information. The display information is extended display identification data (EDID) information that includes including resolution information, size information, and identification information (ID) for each individual display. Hereinafter, the display information is referred to as EDID information.

The displays #1 to #10 may be arranged such that the multi-display 10 has an arbitrary form and arbitrary relationship to each other. The form of the multi-display 10 may be variously modified for the purpose of aesthetic design and interior as shown in FIGS. 4 to 8.

The distributor 20 may be connected to the multi-display 10 and the image source unit 30 through a wired or wireless communication path. The distributor 20 includes a position detector 21, an arrangement calculator 22, a timing controller 23, and an image processor 24.

The position detector 21 synchronizes the user input pattern sensing information and the EDID information sequentially input from each of the displays #1 to #10 with time information input from the timing controller 23, generates the EDID and time-position information together with display identification information (panel ID) of each of the displays #1 to #10, and outputs sequentially them to the arrangement calculator 22.

When the user input pattern is the touch input pattern, as shown in FIG. 6, the EDID and time-position information includes resolution information of a corresponding display, size information of the corresponding display, time and position information of a start touch point in the corresponding display, and time and position information of a last touch point in the corresponding display. On the other hand, when the user input pattern is the optical input pattern, as shown in FIG. 6, the EDID and time-position information includes resolution information of a corresponding display, size information of the corresponding display, time and position information of a start light receiving point in the corresponding display, and time and position information of a last light receiving point in the corresponding display.

The position detector 21 sequentially processes the EDID and time-position information of the displays #1 to #10 that are sequentially touched or light-received, and sequentially outputs the processed information to the arrangement calculator 22. Namely, the displays are first organized in a desired grouping, such as that shown in FIG. 5. After the individual displays are positioned in a desired group to create a single large, multi-tiled display, a user than provides an input to each display of the group to provide an indication of their relationship to each other. For example, a user many place their finger on a first display labelled #1 and move their finger in a sequence across the group of the displays by sliding from one display to the next in the pattern shown in FIG. 5 by the line having the arrow. The finger of the user will cross the boundary from display #1 to display #2. As the figure crosses the boundary between #1 and #2, the position sensor data is sent arrangement calculator 22 that determines the relative position and relationship between display #1 and #2. The distributor 20 has stored therein the size, dimensions and resolution of each display. As the input is received from the user as their move their finger from one display to the next, the system stores this data. The data is then used to determine the exact position of each display relative to each other display and the location of each display within the group as whole. The displays can then be treated as a single large display with multi-tiles, each display being one tile in the large single display 10.

For example, when the user input pattern and the multi-display 10 are implemented as shown in FIG. 5, the position detector 21 sequentially processes the EDID and time-position information of the displays #1 to #12 in order of 1→2→3→6→5→4→7→8→9→12→11→10, and sequentially outputs the EDID and time-position information to the arrangement calculator 22.

When the user input pattern and the multi-display 10 are implemented as shown in FIG. 7, the position detector 21 sequentially processes the EDID and time-position information of the displays #1 to #12 in order of 1→4→7→10→11→12→9→6→3→2→5→8, and sequentially outputs the EDID and time-position information to the arrangement calculator 22.

When the user input pattern and the multi-display 10 are implemented as shown in FIG. 8, the position detector 21 sequentially processes the EDID and time-position information of the displays #1 to #10 in order of 2→1→3→→→5→8→10→9→6→7, and sequentially outputs the EDID and time-position information to the arrangement calculator 22.

When each display has been properly sequentially sensed and there is no additional input from the displays #1 to #10 for a predetermined time or more, the position detector 21 outputs a sensing completion signal to the arrangement calculator 22.

The arrangement calculator 22 includes a memory and stores the display identification information (panel ID), the EDID and time-position information of the displays #1 to #10 sequentially input from the position detector 21 in the memory. When the sensing completion signal is inputted from the position detector 21, the arrangement calculator 22 calculates positions of boundaries of the displays #1 to #10 using the display identification information (panel ID), the EDID and time-position information of the displays #1 to #10 stored in the memory. The displays #1 to #10 include a plurality of boundaries, and the user input pattern is applied to all of the displays #1 to #10 through some of the boundaries. The arrangement calculator 22 can calculate which of the displays #1 to #10 are adjacent to each other and an accurate arrangement position using the resolution, the size, the identification information (panel ID), the position of the start touch/light receiving point, and the position of the last touch/light receiving point of each of the displays #1 to #10.

The timing controller 23 controls operation timing of the position detector 21 and the arrangement calculator 22. The timing controller 23 generates time information and synchronizes the time information with position sensing order of the position detector 21.

The image processor 24 receives an original image of an image source from the image source unit 30 through a wired or wireless communication path. The image processor 24 divides the original image of the image source in accordance with the arrangement positions of the displays #1 to #10, and distributes (transmits) the divided original image to the displays #1 to #10.

Figure 9:
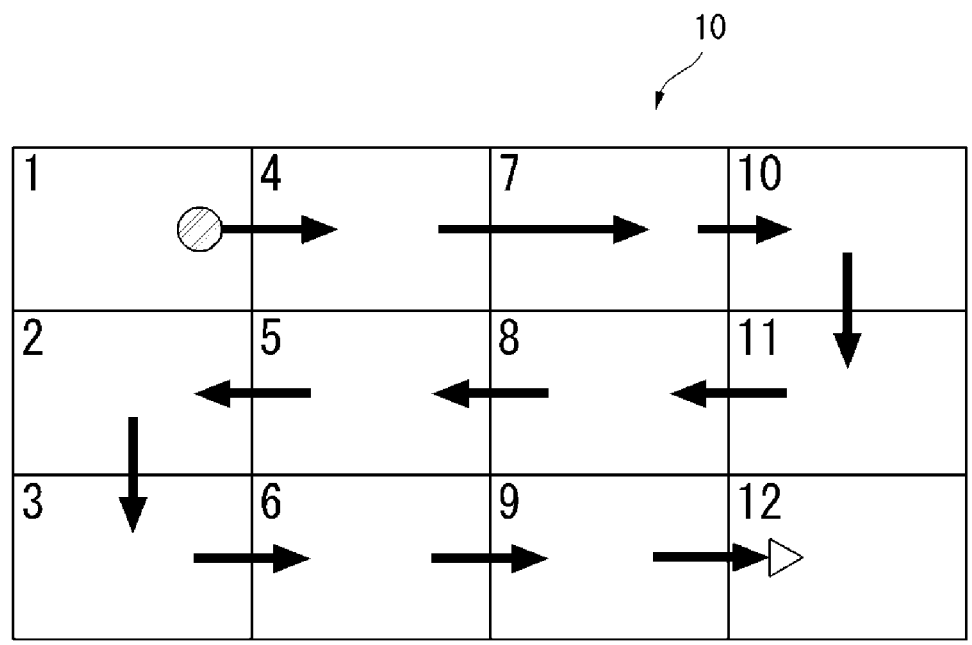
FIG. 9 is a diagram illustrating the other example of a user input pattern for a multi-display arranged in a first form.
Figure 10:
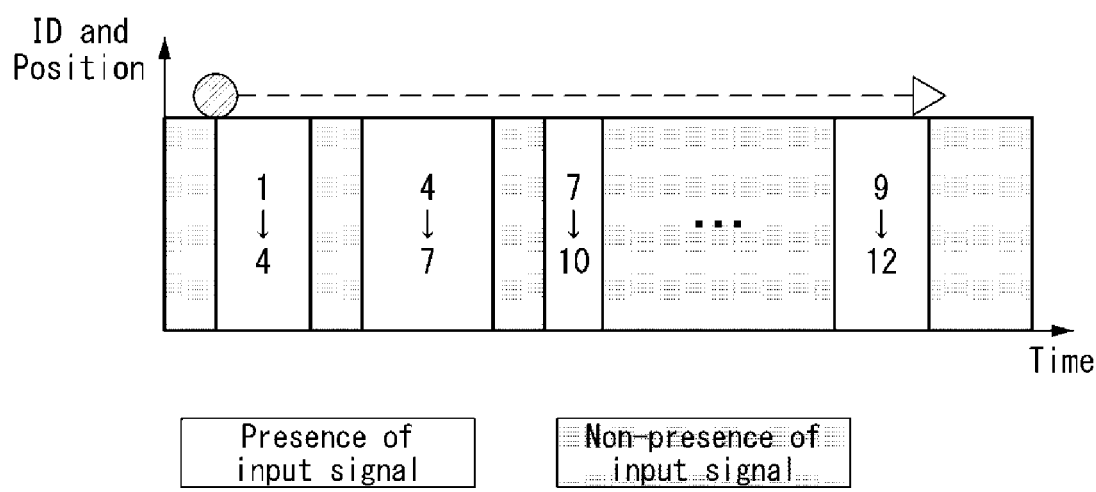
FIG. 10 is a diagram illustrating display identification information and position information of a user input pattern according to time.

FIG. 9 is a diagram illustrating the other example of a user input pattern for a multi-display arranged in a first form. FIG. 10 is a diagram illustrating display identification information and position information of a user input pattern according to time.

Referring to FIG. 9, the user input pattern may be continuous only in some boundaries between the displays #1 to #12 and in the boundaries' vicinity, and may be discontinuous in other regions. In order to grasp the relative position between the displays #1 to #12, touch coordinates or light receiving coordinates of the displays #1 to #12 are required at some boundary positions. Therefore, the user input pattern may not be applied to a region other than the boundaries' vicinity. In order for the arrangement calculator 22 to have adequate data to know the position of each display is sufficient for the position input to include the boundary transition from one display to the next. It is not necessary for the position input to include a continuous set of data points across each display.

Referring to FIG. 10, the arrangement calculator 22 is interlocked with the time information generated by the timing controller 23, so that the arrangement calculator 22 can recognize the identification information (the panel ID) and an arrangement order of the displays #1 to #12 based on touch/light receiving order according to time. For example, the arrangement calculator 22 senses a swipe from the boundary of #1 to the boundary of #4 at a particular location on each of these displays. The system stores that #1 is adjacent to #4 and the relative positions of each to the other since it has sensed where on the boundary of #1 the user input left display #1 and where on the boundary of #4 it entered #4. Even though there is no sensing across all of #4, the arrangement calculator 22 receives input data about the boundary location of #4 relative to boundary of #7. This data is then processed in arrangement calculator 22. This continues until the arrangement calculator 22 has data about the boundary of each display in the multi-tile display of each individual display relative to at least one other display. In some instances, the data will include the relative position information of one display to 2 or in some cases 3 or more other displays.

Figure 11A:
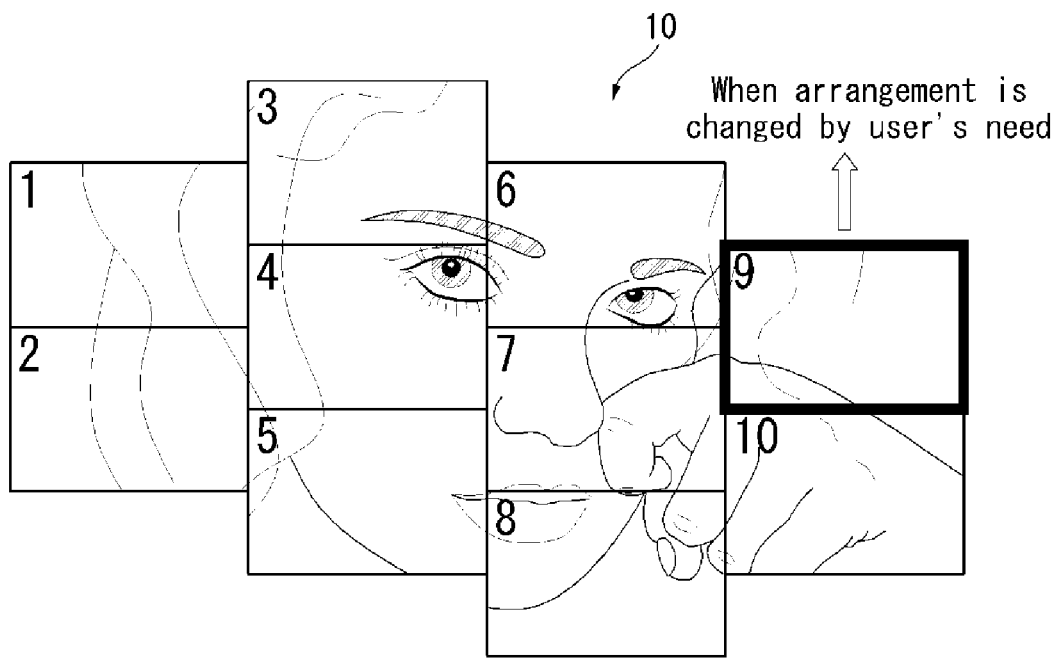
FIGS. 11A and 11B are diagrams for explaining an effect of the disclosure in which a mismatch does not occur in a reproduced image even if arrangement of some displays of a multi-display is changed by a user.
Figure 11B:
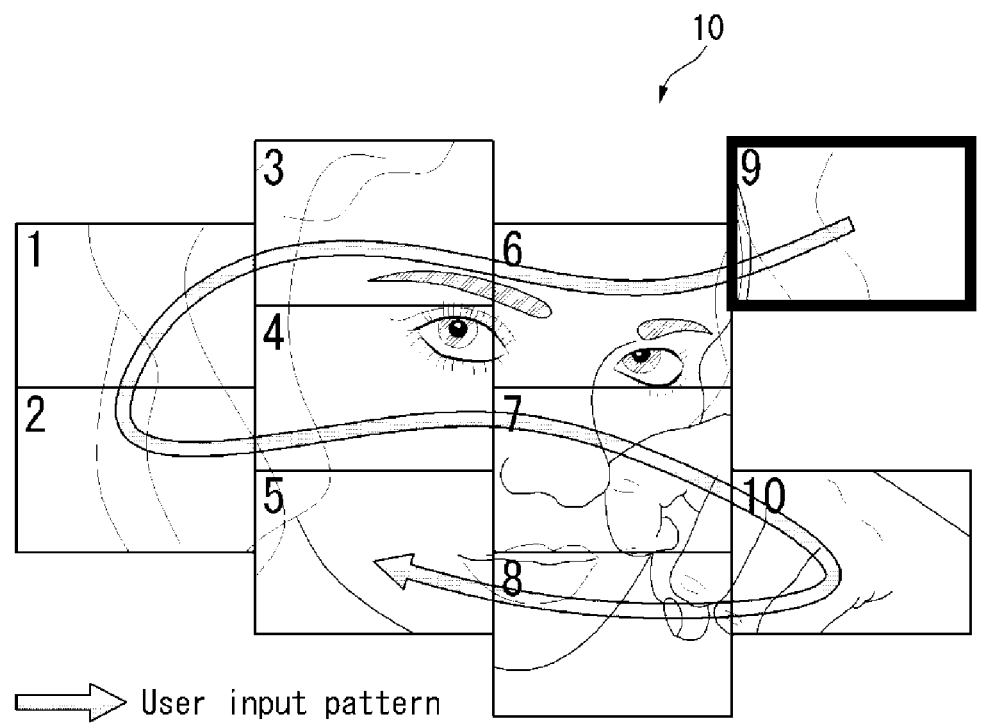

FIGS. 11A and 11B are diagrams for explaining an effect of the disclosure.

Referring to FIGS. 11A and 11B, even if an arrangement of some displays (display No. 9) of a multi-display is changed by a user, the embodiment of the disclosure applies a user input pattern (touch pattern, light pattern) to the changed multi-display to obtain user input pattern sensing information and display information. The embodiment of the disclosure can obtain display identification information, EDID and time-position information by synchronizing the user input pattern sensing information and the display information with time information. The embodiment of the disclosure can easily calculate the changed arrangement position of the displays based on the obtained display identification information, EDID and time-position information.

The embodiment of the disclosure can obtain an accurate position and arrangement information of the arbitrarily arranged displays, appropriately divide and distribute the original image in accordance therewith, so that the embodiment of the disclosure can solve problems such as a mismatch of images occurred due to position change of some displays. The arrangement calculator 22 provides the relative position data of each display #1-#10 to the image processor 24 that will then accept the image from the image source 30 and output it to single display 10 which is a multi-tile display that has been newly created in a previously unplanned manner.

As one example, a group of friends are together at a location, such as ball game, a concert, an airport or other location. They all wish to watch the same video program, but the individual cell phones or tablets of each do not provide a satisfactory way to have a joint viewing experience for the entire group.

Using the system and principles as taught herein, each member of the group will then place their cell phones, notebooks or tablets next to each other to create a multi-tile display 10. One member of the group will provide the input as the user to show the relative positions of each display to the others, whether by finger movement across the displays, light sensing or other technique. In this example, the distributor 20 is placed in sensing mode or otherwise put in a state to receive user input from the now created display. When the distributor 20 is in the sensing input mode, one of the group, as the user, moves their finger in a pattern that crosses the boundary of each display at a location where it is adjacent to another display in the group. The arrangement calculator 22 will then perform the relative relationship calculations of each display to the other and output this to the processor 24 to display the single image to the large single display 10 that is a multi-tile display. After sufficient data is collected that the arrangement calculator 22 can determine the position of each display relate to the other displays in the single multi-tile display 10, then the distributor 20 can be taken out of the sensing mode if desired and placed into the display mode. The system is now ready to as a single large display, with each other individual displays being one tile in the multi-tile display.

The embodiment of the disclosure enables optimized image division and distribution when a multi-display is implemented by combining different displays having arbitrary sizes and resolutions.

The embodiment of the disclosure can provide a high degree of freedom to combination and arrangement of displays in which aesthetic design and interior are required.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A multi-tile display system, comprising:
   a multi-tile display having a plurality of individual displays organized as a group of displays, each display including a sensor for sensing a user input pattern;
   a processor positioned within one of the plurality of individual displays, the processor configured to:
      sequentially output extended display identification data and time-position information together with display identification information of each of the displays based on user input pattern sensing information and display information input from each of the display,
      calculate arrangement positions of the displays based on the display identification information and the extended display identification data and time-position information, and
      generate a sensing completion signal after a predetermined time when the user input pattern is not additionally received; and
   an image processor included within the processor, the image processor being in one of the plurality of individual displays, the image processor being configured to, in response to the sensing completion signal, divide and distribute an original image of an image source in accordance with the arrangement positions of the displays to create a single image that includes portions on each of the individuals displays in the multi-tile display,
   wherein the processor within one of the plurality of displays communicates with the other individual displays of the plurality of displays to output the single image on the group of the individual displays without use of an outside processor that is not within the group of individual displays,
   wherein the arrangement positions of the display are calculated whether the user input pattern is continuous or discontinuous at boundaries between the displays prior to the generation of the sensing completion signal.

2. The multi-tile display system of claim 1, wherein the user input pattern is a touch input pattern and the sensor is a touch sensor.

3. The multi-display system of claim 2, wherein the extended display identification data and time-position information includes resolution information of a corresponding display, size information of the corresponding display, time and position information of a start touch point in the corresponding display, and time and position information of a last touch point in the corresponding display.

4. The multi-display system of claim 1, wherein the user input pattern is an optical input pattern and the sensor is a light receiving sensor.

5. The multi-display system of claim 4, wherein the extended display identification data and time-position information includes resolution information of a corresponding display, size information of the corresponding display, time and position information of a start light receiving point in the corresponding display, and time and position information of a last light receiving point in the corresponding display.

6. The multi-display system of claim 1, wherein the processor calculates positions of boundaries of the displays based on the display identification information and the extended display identification data and time-position information.

7. The multi-display system of claim 1, wherein the displays include a plurality of boundaries, and
   the user input pattern is applied to all of the displays through the boundaries.

8. The multi-display system of claim 7, wherein the user input pattern is continuous only at the location of contiguous boundaries between adjacent displays.

9. The multi-display system of claim 1, wherein the multi-tile display includes a plurality of boundaries, each of the boundaries disposed between adjacent displays of the multi-tile display, and
   wherein the user input pattern is continuous across only a first portion of the boundaries and is discontinuous across a second portion of the boundaries.

10. The multi-tile display system of claim 1, wherein the processor is capable of transmitting a common driving signal to drive the rest of the plurality of individual displays, the common driving signal driving the plurality of individual displays to display as a single unit.

11. A driving method of a multi-display system by using any one of a plurality of display devices to drive the multi-display, each display device having a display that includes a sensor for sensing a user input pattern, comprising:
   outputting sequentially extended display identification data and time-position information together with display identification information of each of the displays based on user input pattern sensing information and display information input from each of the displays;
   storing the display identification information and the extended display identification data and time-position information of each of the displays;

calculating arrangement positions of the displays based on the display identification information and the extended display identification data and time-position information;

calculating the arrangement positions of the displays whether the user input pattern is continuous or discontinuous at boundaries between the displays;

generating a sensing completion signal after a predetermined time when the user input pattern is not additionally received;

communicating between a processor within one of the plurality of display devices and other individual displays of the plurality of display devices to output a single image on the multi-display without use of an outside processor that is not within the plurality of display devices; and in response to the sensing completion signal, dividing and distributing an original image of an image source in accordance with the arrangement positions of the displays as the single image that has one portion of the single image on each of the displays.

12. The driving method of claim 11, wherein the user input pattern is a touch input pattern and the sensor is a touch sensor.

13. The driving method of claim 12, wherein the extended display identification data and time-position information includes resolution information of a corresponding display, size information of the corresponding display, time and position information of a start touch point in the corresponding display, and time and position information of a last touch point in the corresponding display.

14. The driving method of claim 11, wherein the user input pattern is an optical input pattern and the sensor is a light receiving sensor.

15. The driving method of claim 14, wherein the extended display identification data and time-position information includes resolution information of a corresponding display, size information of the corresponding display, time and position information of a start light receiving point in the corresponding display, and time and position information of a last light receiving point in the corresponding display.

16. The driving method of claim 11, wherein the calculating arrangement positions of the displays is calculating positions of boundaries of the displays based on the display identification information and the extended display identification data and time-position information.

17. The driving method of claim 11, wherein the displays include a plurality of boundaries, and the user input pattern is applied to all of the displays through the boundaries.

18. The driving method of claim 17, wherein the user input pattern is continuous only in adjacent boundaries, and is discontinuous in non-adjacent boundaries.

19. The driving method of claim 11, wherein the multi-tile display includes a plurality of boundaries, each of the boundaries disposed between adjacent displays of the multi-tile display, and wherein the user input pattern is continuous across only a first portion boundaries and is discontinuous across a second portion of the boundaries.

20. A multi-tile display system, comprising:

a plurality of individual displays organized as a group of displays, each display being a device having a sensor for sensing a user input pattern; and a processor included in at least one of the device among the plurality of individual displays, capable of transmitting a common driving signal to drive the rest of the plurality of individual displays, the common driving signal drives the plurality of individual displays to display as a single unit, the processor is configured to:

sequentially output extended display identification data and time-position information together with display identification information of each of the displays based on user input pattern sensing information and display information input from each of the displays, and configured to calculate arrangement positions of the displays based on the display identification information and the extended display identification data and time-position information, generate a sensing completion signal after a predetermined time when the user input pattern is not additionally received, wherein the processor within one of the plurality of individual displays communicates with the other individual displays of the plurality of individual displays to output as the single unit on the group of displays without use of an outside processor that is not within the plurality of individual displays, wherein the arrangement positions of the display are calculated whether the user input pattern is continuous or discontinuous at boundaries between the displays prior to the generation of the sensing completion signal.

* * * * *

UNITED STATES PATENT AND TRADEMARK OFFICE
CERTIFICATE OF CORRECTION

PATENT NO. : 10,671,207 B2  
APPLICATION NO. : 15/841142  
DATED : June 2, 2020  
INVENTOR(S) : Dongwon Park et al.

Page 1 of 1

It is certified that error appears in the above-identified patent and that said Letters Patent is hereby corrected as shown below:

In the Claims

Column 12, Claim 19, Line 11:
"first portion boundaries"
Should be:
--first portion of the boundaries--.

Signed and Sealed this
Fifteenth Day of September, 2020

Andrei Iancu
*Director of the United States Patent and Trademark Office*